May 31, 1955

J. G. SMITH 2,709,749

OSCILLATOR

Filed Nov. 16, 1949

*J. G. Smith*
INVENTOR.

May 31, 1955  J. G. SMITH  2,709,749
OSCILLATOR

Filed Nov. 16, 1949  2 Sheets-Sheet 2

*Jack Smith*
INVENTOR.

United States Patent Office 2,709,749
Patented May 31, 1955

2,709,749

OSCILLATOR

Jack G. Smith, Garland, Tex.

Application November 16, 1949, Serial No. 127,678

3 Claims. (Cl. 250—36)

This invention relates to oscillation generating systems, and more particularly to mechanical vibrator frequency stabilized oscillation generating systems.

In many applications it is desirable that an oscillation generating system have an output of highly stable frequency and that it be quickly brought into operation after the oscillation circuit is connected to the prime source of power. Many oscillation generating systems employ a mechanical vibrator, such as a tuning fork, to maintain an output of highly stabilized frequency. In the conventional manner of driving the mechanical vibrator, the vibration of the mechanical vibrator is initiated by a random current in a pick-up coil or a driving coil, the potential of the pick-up coil determining the current in the driving coil. The driving and pick-up coils are so connected that as the amplitude of vibration of the vibrator increases the energization of the driving coil is increased. In this manner the amplitude of vibration of the vibrator is slowly brought to its maximum. The lapse of time between the initiation of vibration and the attainment of the necessary amplitude of vibration may be appreciable. In many applications it is essential that the oscillation generating system be quickly brought to normal operating condition and that it continue to oscillate at the desired frequency regardless of the changes in the input voltage.

Accordingly, it is an object of my invention to provide a new and improved oscillation generating system.

It is another object of my invention to provide a new and improved oscillation generating system having a stabilized frequency output.

It is another object of my invention to provide a new and improved oscillation generating system having a mechanical vibrator for stabilizing the frequency of oscillation.

It is another object of my invention to provide a new and improved oscillation generating system having a variable inductance which varies in accordance with the frequency of oscillation of the oscillation generating system to maintain the frequency of oscillation constant.

It is another object of my invention to provide a new and improved oscillation generating system having a self excited oscillator and a mechanical vibrator set in vibration by the self excited oscillator.

It is another object of my invention to provide a new and improved oscillation generating system which is quickly brought to normal operating condition.

It is still another object of my invention to provide a new and improved oscillation generating system which maintains an output of constant frequency over a wide range of input voltage.

Briefly stated, in accordance with one embodiment of my invention I provide a variable inductance in an oscillation generating system whose value is greatest when the oscillation generating system is oscillating at a certain predetermined frequency. The variable inductance comprises a mechanical vibrator having a certain predetermined natural frequency of vibration and a driving coil associated with the mechanical vibrator. When the current in the driving coil is of the same frequency as the natural frequency of vibration of the mechanical vibrator, the vibrating element or elements of the mechanical vibrator induce a back electromotive force in the driving coil which is exactly 180° out of phase with the driving current. Since the driving current and the current induced by the mechanical vibrator are exactly 180° out of phase when the driving current has the same frequency as the mechanical vibrator, the impedance of the driving coil is greatest when the frequencies are equal. The driving coil may therefore be connected across any frequency determining element of an oscillator generating system to by-pass currents of frequencies not corresponding to the natural frequency of vibration of the mechanical vibrator because the driving coil will present a low impedance to currents of frequencies other than the frequency of vibration of the mechanical vibrator. By shunting critical elements in the oscillation generating system in this manner, the frequency of the generating system can be stabilized by the mechanical vibrator. The oscillation generating system will begin operation as soon as input current is applied to the system, since the impedance of the driving coil will be at a minimum when the mechanical vibrator is at rest. A large initial current will therefore flow through the driving coil and cause the mechanical vibrator to vibrate immediately with considerable amplitude. The generating system will begin to oscillate immediately after it is energized without the usual delay caused by the necessity of gradually increasing the amplitude of vibration of the mechanical vibrator until it reaches a value great enough to bring the oscillation generating system to normal operating condition.

According to another embodiment of my invention, I provide a self excited mechanical vibrator which is set in vibration by a driving coil. A pick-up coil which detects the vibration of the mechanical vibrator is employed to feed back energy to an electric discharge means which is in the circuits of the driving and pick-up coils in order to sustain oscillation of the mechanical vibrator. The oscillations generated by the mechanical vibrator are employed to supply exciting current to a pair of electric valves of an electric translating system. The electric valves have a feedback circuit which transmits a relatively strong pulse to the driving coil of the mechanical vibrator upon initiation of operation so that the mechanical vibrator is quickly brought up to its maximum amplitude of vibration.

For a better understanding of my invention, reference may be had to the following description taken in connection with the accompanying drawing in which.

Figure 1:
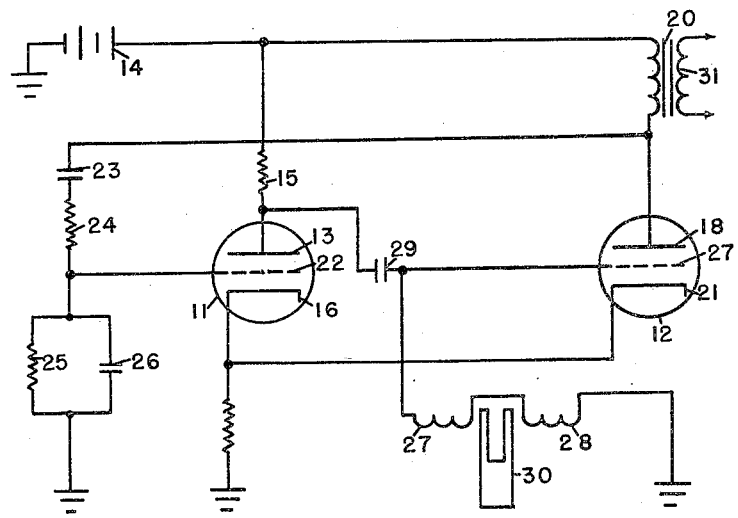
Figure 1 illustrates diagrammatically an embodiment of my invention as applied to a particular oscillation circuit.

Figure 1 illustrates an embodiment of my invention as applied to a conventional resistance-capacitance oscillator. The resistance-capacitance oscillator comprises electric discharge means 11 and 12 which may be of any of the types well known in the art although I prefer to use electric discharge means of the high vacuum type. Electric discharge means 11 comprises an anode 13 connected to the positive side of a direct current source 14 through a resistance 15, and a cathode 16 connected to the other side of direct current source 14 through a resistance 17. The anode 18 of electric discharge means 12 is connected to the positive side of direct current source 14 through the primary winding 18 of a transformer 20 while cathode 21 is connected to the other side of direct current source 14 through resistance 17. Electric discharge means 11 is controlled by means of a control grid 22 which is energized by positive feedback energy from anode 18 of electric discharge means 12 through a capacitance 23 and a resistance 24. A grid lead resistance 25 shunted by a capacitance 26 is connected between control grid 22 and ground.

Electric discharge means 12 is controlled by a control grid 27 which is energized by voltage variations across windings 27 and 28 which are connected between control grid 27 and ground. The voltage variations across windings 27 and 28 are due to the changes in the potential of anode 13 which is connected to control grid 27 and windings 27 and 28 through a coupling capacitance 29. A mechanical vibrator 30 of magnetic material, for example a tuning fork, is positioned between coils 27 and 28 and is set in vibration by the magnetic field set up by windings 27 and 28.

The operation of the resistance capacitance oscillator diagrammatically illustrated in Figure 1 is well known to those skilled in the art if the effect of mechanical vibrator 30 is disregarded and it is assumed that the impedance of coils 27 and 28 is constant. Each electric discharge means 11 and 12 is biased toward cut-off by a conductive state in the other electric discharge means 11 or 12 since the common cathode resistance 17 operates to maintain the same instantaneous potential on cathodes 16 and 21. The potential on grid 22 of electric discharge means 11 varies in accordance with the potential of anode 18 of electric discharge means 12 since a zero shift is maintained between the potentials of grid 22 and anode 18. In order to eliminate phase shift, the capacitances 23 and 26 and the resistances 24 and 25 are made equal in value and the electric discharge means 11 and 12 tend to oscillate at the periodic frequency of the network which includes capacitances 23 and 26 and resistances 24 and 25.

If the effect of the mechanical vibrator 30 and coils 27 and 28 upon the resistance-capacitance oscillator is now considered, it will be apparent that if electric discharge means 11 is initially rendered conductive, the potential of anode 13 decreases suddenly causing capacitance 29 to discharge through electric discharge means 11. When this occurs, control grid 27 is driven more positive, since it is connected to one side of capacitance 29, and a surge of current is caused to flow through windings 27 and 28. With vibrator 30 at rest the impedance of windings 27 and 28 is great enough to allow a potential to be impressed on control grid 27 which will render electric discharge means 12 conductive. Once vibrator 30 is set in vibration, it induces a back electromotive force in windings 27 and 28 which pulsates at the natural frequency of vibration of vibrator 30. The impedance of windings 27 and 28 therefore pulsates at the same rate presenting a very high impedance to current flowing from capacitance 29 during a certain period in its cycle of pulsation and presenting a very low impedance at the period in its cycle of vibration 180° removed from its period of greatest impedance. If capacitance 29 discharges at a time in the cycle of vibration of vibrator 30 in which the impedance of windings 27 and 28 is very low, the potential impressed on control grid 27 by the discharge of capacitance 29 will be very small and insufficient to render electric discharge means 12 conductive because windings 27 and 28 will act as a low impedance shunt. Electric discharge means 12 will be rendered conductive only at the times the discharges of capacitance 29 synchronize with the periods of high impedance of windings 27 and 28. In this manner, the oscillation generating system is caused to oscillate at the frequency of vibration of vibrator 30.

In normal operation vibrator 30 is maintained in vibration by the relatively small current which passes through windings 27 and 28 each time capacitance 29 discharges. It is not necessary that the resistance capacitance oscillator which comprises electric discharge means 11 and 12 have exactly the same frequency of oscillation as the frequency of vibration of vibrator 30 but the frequencies of oscillation and vibration must not vary too greatly since otherwise the vibrator 30 will not be maintained in vibration and the oscillation generating system will deliver an output determined solely by the periodic frequency of the networks comprising capacitances 23 and 26 and resistances 24 and 25.

While I prefer to connect windings 27 and 28 across grid 27 and cathode 21 of electric discharge means 12, it will be obvious to those skilled in the art that windings 27 and 28 can be connected across other elements of the resistance-capacitance oscillator. For example, windings 27 and 28 can be connected across grid 22 and cathode 16 of electric discharge means 11 or across capacitance 23 and resistance 24. Windings 27 and 28 can also be connected across either primary winding 19 or secondary winding 31, and across either resistance 15 or resistance 17. Since the latter elements of the resistance capacitance oscillator are in the anode-cathode circuits of electric discharge means 11 and 12, the impedance variations of coils 27 and 28 will have to be quite large in order to control the frequency of oscillation. For this reason, I prefer to connect the windings 27 and 28 to the control grid of either electric discharge means 11 or 12.

I provide two windings 27 and 28 in order to impose symmetrical forces on vibrator 30 but it will be apparent to those skilled in the art that only one winding 27 or 28 need be employed if it is so desired.

Figure 2:
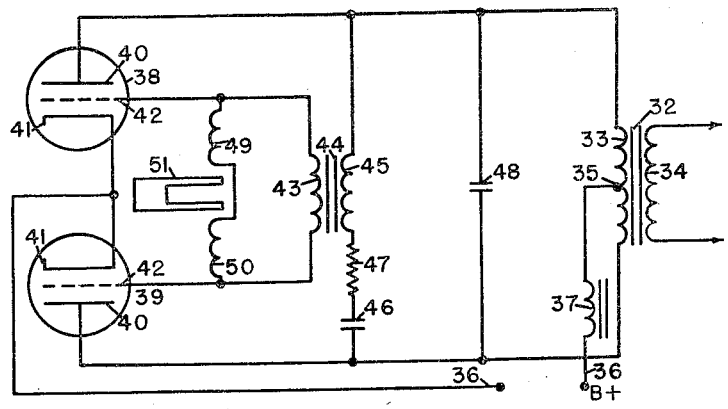
Figure 2 illustrates diagrammatically an embodiment of my invention as applied to another oscillation circuit.

Figure 2 illustrates diagrammatically my invention as applied to a self excited parallel type thyratron inverter. The inverter comprises a transformer 32 provided with a primary winding 33 and a secondary winding 34. The primary winding 33 has its electrical midpoint 35 connected to one side of a direct current source 36 through a smoothing reactor 37 and its end terminals connected to the other side of direct current source 36 through electric discharge means 38 and 39. Each of the electric valves 38 and 39 is provided with an anode 40, a cathode 41 and a control grid 42, and may be of any of the several types well known in the art, although I prefer to utilize electric valves of the gaseous discharge type.

In order to render electric valves 38 and 39 alternately conductive and nonconductive, the control grids 42 of electric valves 38 and 39 are connected to opposite ends of a secondary winding 43 of a transformer 44. One end of the primary winding 45 of transformer 44 is connected to anode 40 of electric valve 39 while the other end of primary winding 45 is connected to anode 40 of electric valve 38 through a resistance 47 and a capacitance 46. A commutating capacitor 48 is connected across primary winding 33 to effect commutation between electric valves 38 and 39.

Connected across secondary winding 43 are windings 49 and 50. A mechanical vibrator 51 of magnetic material, for example a tuning fork, is positioned between coils 49 and 50 and is set in vibration by the magnetic field set up by windings 49 and 50.

The general principles of operation of the above described inverter will be well understood by those skilled in the art. In brief, if one of the electric valves, for example, electric valve 38, is initially rendered conductive, current will flow from one side of direct current source 36 through the upper portion of primary winding 33 and electric valve 38 to the other side of direct current source 36, including a half cycle of alternating current in secondary winding 34 of transformer 32. During this interval capacitor 48 is charged to a potential substantially twice that of the direct current source 36 and when electric valve 39 is rendered conductive, the stored energy of the capacitor 48 is effective to transfer the current from electric valve 38 to electric valve 39 so that current now flows through the lower portion of primary winding 33 inducing a half cycle of opposite polarity in the secondary winding 34. In this manner an alternating current is induced in secondary winding 34. It is apparent then that the inverter which comprises electric valves 38 and 39 is an oscillator since it produces an oscillating potential in secondary winding 34.

Electric valves 38 and 39 are rendered conductive alternately by the potentials impressed on control grids 42. Resistance 47, condenser 46 and primary winding 45 comprise a phase shift circuit for suppling control grids 42 with potential. Assuming that the direct current source 36 is initially connected to primary winding 33, one of the electric valves, say electric valve 39, is rendered conductive by a random potential on its grid 42. When electric valve 39 is conductive, a potential appears across primary winding 45 whose phase is determined by the values of the impedance of transformer 44, the resistance 47 and the capacitance 46. The potential appearing across primary winding 45 induces a potential across secondary winding 43 which is impressed on control grid 42 of electric valve 38 and renders electric valve 38 conductive. Since commutating capacitor 48 impresses a negative potential on anode 40 of electric valve 39 when electric valve 38 is rendered conductive, electric valve 39 immediately ceases to conduct. After a lapse of time determined by the phase shift circuit comprising transformer 44, resistance 47 and capacitance 46, a potential is impressed on grid 42 of electric valve 39 which again renders electric valve 39 conductive and electric valve 38 is in turn rendered nonconductive. This cycle of operation would be repeated at a frequency determined by the values of the elements of the phase shift circuit if windings 49 and 50 and vibrator 30 were not present.

Windings 49 and 50 and vibrator 51 function in the same manner as the windings 27 and 28 and vibrator 30 illustrated in Figure 1 to cause electric valves 38 and 39 to fire at the rate determined by the natural frequency of vibration of vibrator 51. The frequency of the alternating current induced in secondary winding 34 is, therefore, kept equal to the natural frequency of vibration of vibrator 51.

As in the oscillation generator illustrated in Figure 1, the frequency control may be achieved by placing the variable impedance coils 49 and 50 across any elements of the frequency controlling circuit. For example, windings 49 and 50 may be connected across winding 45, resistance 47, or capacitance 46. In each of those positions, the vibrator 51 will be set in vibration at its natural frequency of vibration immediately upon the firing of an electric valve 38 or 39. The frequency of oscillation of the inverter is made approximately equal to the natural frequency of vibration of vibrator 51 in order to prevent the inverter from oscillating at a frequency so far removed from the natural frequency of vibration of vibrator 51 that vibrator 51 will be unable to pull the inverter into synchronism. In the latter event, the fork may be stopped from vibrating altogether and the inverter will oscillate at the frequency determined by the electrical quantities of the feedback circuit.

Figure 3:
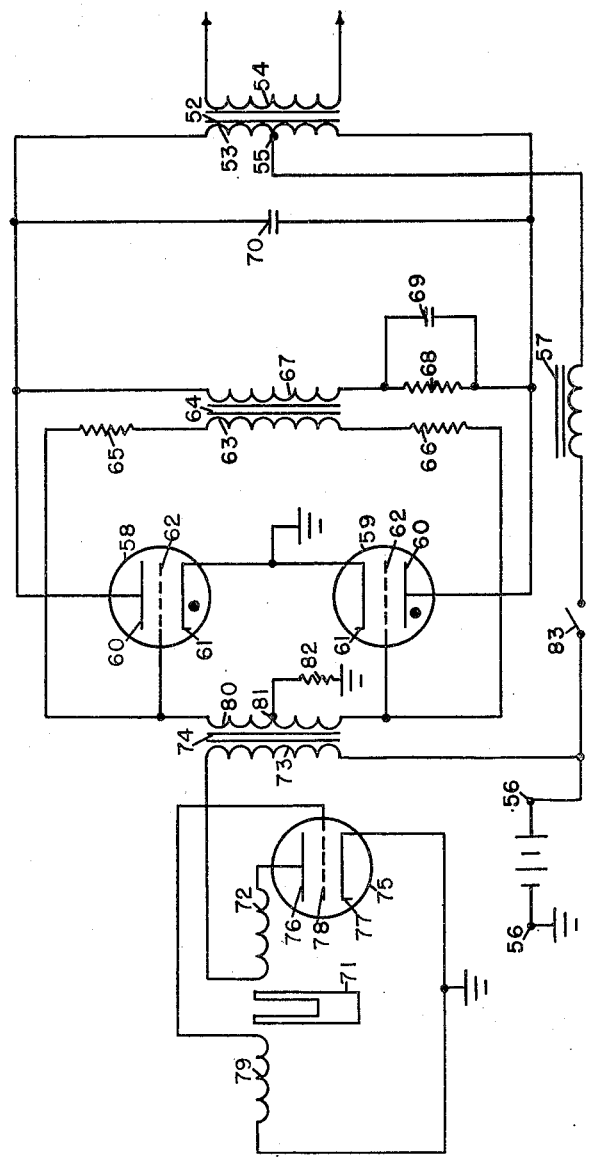
Figure 3 illustrates an embodiment of my invention as applied to a third oscillation circuit.

Figure 3 illustrates diagrammatically another embodiment of my invention as applied to a self excited parallel type inverter. The inverter comprises a transformer 52 provided with a primary winding 53 and a secondary winding 54. The primary winding 53 has its electrical midpoint 55 connected to one side of a direct current source 56 through a smoothing reactor 57 and its end terminals connected to the other side of direct current source 56 through electric valves 58 and 59. Each of the electric valves 58 and 59 is provided with an anode 60, a cathode 61 and a control grid 62, and may be of any of the several types well known in the art, although I prefer to utilize electric valves of the gaseous discharge type.

In order to render electric valves 58 and 59 alternately conductive and nonconductive, the control grids 62 of electric valves 58 and 59 are connected to opposite ends of a secondary winding 63 of a transformer 64 through current limiting resistances 65 and 66. One side of the primary winding 67 of transformer 64 is connected to anode 60 of electric valve 58 while the other side of primary winding 67 is connected to anode 60 of electric discharge means 59 through a resistance 68 and capacitors 69 which are connected in parallel. A commutating capacitance 70 is connected across primary winding 53 to effect commutation of current between electric valves 58 and 59.

The general principles of operation of the above described portion of the oscillation generating system illustrated in Figure 3 will be well understood by those skilled in the art. In brief, if one of the electric valves, for example, electric valve 58, current will flow from one side of direct current source 56 through the upper portion of primary winding 53 and electric valve 58 to the other side of direct current source 56 inducing a half cycle of alternating current in secondary winding 54 of transformer 52. During this interval capacitance 70 is charged to a potential substantially twice that of direct current source 56 and when electric valve 59 is rendered conductive, the stored energy of the capacitance 70 is effective to transfer the current from electric valve 58 to electric valve 59 so that current now flows through the lower portion of primary winding 53 inducing a half cycle of opposite polarity in the secondary winding 54. In this manner an alternating current is induced in secondary winding 54.

Electric valves 58 and 59 are rendered alternately conductive by the potential impressed on control grids 62. Primary winding 67, capacitance 69 and resistance 68 comprise a phase shift circuit for supplying control grids 62 with potential. Assuming that the direct current source 56 is initially connected to primary winding 53, one of the electric valves, say electric valve 59, is rendered conductive by a random potential on its control grid 62. When electric valve 59 is conductive, a potential appears across primary winding 67 whose phase is determined by the values of the impedance of the transformer 64, the resistance 68, and the capacitance 69. The potential appearing across winding 67 induces a potential across secondary winding 63 which is impressed on control grid 62 of electric valve 59 and which renders electric valve 58 conductive. Since commutating capacitance 70 impresses a negative potential on anode 60 of electric valve 59 when electric valve 58 is rendered conductive, electric valve 59 immediately ceases to conduct. After a lapse of time determined by the phase shift circuit comprising transformer 64, capacitance 69 and resistance 68, a potential is impressed on grid 62 of electric valve 59 which again renders electric valve 59 conductive. Electric valve 58 is in turn rendered nonconductive when electric valve 59 is again rendered conductive. This cycle of operation will be repeated at a frequency determined by the values of the elements of the phase shift circuit but this frequency is not sufficiently stable for many applications since it may vary from time to time with changes in temperature, in the load across winding 54, in the potential of direct current source, and in other conditions which affect the electrical qualities and quantities of the above described self excited oscillator.

In order to stabilize the frequency of oscillation, I provide a mechanical vibrator 71 of magnetic material which may be a tuning fork or reed. The vibrator is driven by a driving means or coil 72 which is connected to direct current source 56 through a primary winding 73 of a transformer 74 and an electric discharge means 75. Electric discharge means 75 comprises an anode 76, a cathode 77 and a control grid 78, and may be of any of the several types well known in the art although I prefer to employ an electric discharge means of the high vacuum type. A pick-up coil 79 positioned adjacent to vibrator 71 is affected by the vibration of vibrator 71 and is adapted to generate an oscillatory electric current or voltage as a result thereof. The pickup coil 79 is connected between the control grid 78 and cathode 77 of electric discharge means 75 so that as the amplitude of vibration of vibrator 71 increases, the oscillating potential impressed on control grid 78 increases causing an increase in the pulsating current flowing through winding 73 and driving coil 72. In this manner, the amplitude of vibration of vibrator 71 is brought up to the value necessary to maintain a predetermined current flowing in winding 73. An alternating current is induced in secondary winding 80 of transformer 74 by the current flowing in primary winding 73. Secondary winding 80 has its electrical midpoint 81 connected to ground through a current limiting resistance 82 while its opposite sides are connected to control grids 62 of electric valves 58 and 59 and across resistance 65, winding 63 and resistance 66. The alternating potentials impressed on control grids 62 are the summation of the potential induced in winding 80 by mechanical vibrator 71 and the potential delivered by the feedback network which comprises transformer 64. The potentials induced by mechanical vibrator 71 in winding 80 have a frequency equal to the natural frequency of vibration of vibrator 71 and will stabilize the frequency of oscillation of electric discharge means 58 and 59. The output voltage across secondary winding 54 of transformer 52 will therefore be of the same frequency as the natural frequency of vibration of vibrator 71.

The parallel type inverters whose frequency is controlled by a mechanical vibrator found in the prior art are not of the self excited type, i. e., the feedback circuit comprising transformer 64, capacitance 69 and resistance 68 is not present. In the usual manner of operation of this type of inverters, the energization of the anode-cathode circuits of electric valves 58 and 59 is delayed for a predetermined period time after the initiation of operation of the apparatus. In this period of time, the amplitude of vibration of vibrator 71 is slowly increased so that when the anode-cathode circuits of electric valves 58 and 59 are energized, as by switch 83, the potentials impressed on control grids 62 are sufficiently great to cause electric valves 58 and 59 to fire. If for some reason the vibrator 71 has not attained the requisite amplitude of vibration at the time the anode-cathode circuits of electric valves 58 and 59 are energized, the electric valves 58 and 59 will fire at random until some part of the inverter circuit fails. The delay in the attainment of the requisite amplitude of vibration of vibrator 71 may be due to low voltage supplied by direct current source or a change in the characteristics of the electric discharge means 75. In fact, the voltage of direct current source 56 may be so low that vibrator 71 will never attain the requisite amplitude of vibration.

By employing the feedback circuit that comprises transformer 64, capacitance 69 and resistance 68, I ensure that the amplitude of vibration of vibrator 71, over a certain range of voltage of direct current source 56, will be sufficiently great to render electric valves 58 and 59 alternately conductive with a frequency equal to the natural frequency of vibration of vibrator 71. Assuming that the amplitude of vibration of vibrator 71 is insufficient to deliver potentials to control grids 62 which will render electric valves 58 and 59 alternately conductive when their anode-cathode circuits are connected to direct current source 56, a random current will render one of the electric valves, say electric valve 58, conductive. When electric valve 58 becomes conductive, capacitance 69 begins to charge and a pulse of current is caused to flow from the positive side of direct current source 56 through the lower portion of winding 53, the resistance 68 and capacitance 69 phase shift circuit, winding 67, and the anode-cathode circuit of electric valve 58 to the negative side of direct current source 56. The pulse of current flowing in winding 67 will induce a pulse of current in winding 63 which will flow through resistance 66, winding 80 and resistance 65. The midpoint 81 of winding 80 is connected to cathodes 61 through a current limiting resistance 82 in order to impress a potential between cathode 61 and control grid 62 of electric discharge means 59 of sufficient magnitude to render electric valve 59 conductive. When electric valve 59 becomes conductive, commutating capacitance 70 commutates the current from electric valve 58 to electric valve 59 and a pulse of current is transmitted through winding 67 in the opposite direction inducing a pulse of current in winding 63 which impresses a potential on control grid 62, causes electric valve 58 to again become conductive and transmits a pulse of current in the opposite direction in winding 80. In this manner, electric valves 58 and 59 are made alternately conductive even though vibrator 71 has not attained an amplitude of vibration sufficient to generate a potential great enough to render electric valves 58 and 59 conductive. At the same time, the pulses of current in winding 80 induce pulses of current in winding 73 which are transmitted through driving coil 72 and electric discharge means 75. The pulses of current in driving coil 72 increase the amplitude of vibration of vibrator 71 and it is quickly brought to its normal operating condition.

The self excited oscillator which comprises electric valves 58 and 59, and the resistance 68 and capacitance 69 phase shift circuit is designed to have a frequency of oscillation approximately equal to the natural frequency of vibration of vibrator 71 so that the pulses of current induced in winding 80 by the feedback circuit which comprises winding 63 reinforce the pulses of current induced in winding 80 by vibrator 71. Vibrator 71 acts as a synchronizing element to control the frequency of oscillation of the oscillation generating system.

While I have shown and described my invention as applied to particular self excited oscillators, it will be apparent to those skilled in the art that the application of my invention for quickly initiating operation a mechanical vibrator employed to stabilize the frequency of oscillation of self excited oscillators is not limited to the above described oscillators but may be employed with any self excited oscillator.

Important advantages of oscillation generating systems built in accordance with the teachings of my invention are the instant generation of oscillations of controlled frequency upon initiation of operation of the oscillation generating systems, the maintenance of vibration of the mechanical vibrators at the amplitude of vibration necessary to control the frequency of oscillation of the output of the oscillation generating system over a considerable range of input voltage, and the maintenance of very constant frequency of oscillation of the output of the oscillation generating systems.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An oscillation generating system comprising an input circuit; a pair of electric discharge means connected in parallel across said input circuit, each of said electric discharge means having an anode, a cathode and a control grid; a commutating capacitance connected across said anodes; a phase shifting circuit connected across said anodes; a transformer having a primary winding connected in series with said phase shifting circuit and a secondary winding connected across said control grids of said electric discharge means for providing regenerative feedback in said electric discharge means, an inductive winding coupled to said secondary winding energized by said regenerative feedback; a tuning fork adapted to be set in vibration by said regenerative feedback in said inductive winding, the impedance of said inductive winding varying in accordance with the vibrational displacement of said tuning fork, the frequency of oscillation determined by said phase shift circuit being approximately equal to the natural frequency of vibration of said tuning fork.

2. In an oscillation generating system; an input circuit; a pair of electric discharge means connected in parallel across said input circuit, each of said electric discharge means having input electrodes including a control grid and a cathode and output electrodes including an anode and said cathode; a feedback network connecting said input electrodes to said output electrodes, said network comprising a transformer having a secondary winding connected across said control grids of said electric discharge means and a primary winding connected across said anodes of said electric discharge means in series with a phase shift circuit; and an inductive winding connected across a portion of said feedback network and energized by the regenerative feedback of said feedback network; a mechanical vibrator operatively associated with said inductive winding and set in vibration by said regenerative feedback in said inductive winding, the frequency of oscillation determined by said feedback network being approximately equal to the natural frequency of vibration of said mechanical vibrator.

3. In an oscillation generating system: an input circuit; a pair of electric discharge means connected in parallel across said input circuit, each of said electric discharge means having input electrodes including a control grid and a cathode and output electrodes including an anode and said cathode; a feedback network connecting said input electrodes to said output electrodes for providing regenerative feedback in said electric discharge means, said network comprising a transformer having a secondary winding connected across said control grids of said electric discharge means and a primary winding connected across said anodes of said electric discharge means in series with a resistance-capacitance phase shift circuit; and an inductive winding coupled to said feedback network and energized by said regenerative feedback; a mechanical vibrator operatively associated with said inductive winding and set in vibration by said regenerative feedback in said inductive winding for varying the impedance of sad inductive winding in accordance with the vibrational displacement of said mechanical vibration, the frequency of oscillation determined by said feedback network being approximately equal to the natural frequency of vibration of said mechanical vibrator.

References Cited in the file of this patent

UNITED STATES PATENTS

| Number | Name | Date |
|---|---|---|
| 1,811,126 | Harrison | June 23, 1931 |
| 1,811,128 | Harrison | June 23, 1931 |
| 2,001,132 | Hansell | May 14, 1935 |
| 2,018,318 | Purington | Oct. 22, 1935 |
| 2,101,272 | Scott | Dec. 7, 1937 |
| 2,302,895 | Root | Nov. 24, 1942 |
| 2,549,807 | Heed | Apr. 24, 1951 |
| 2,574,136 | Warren | Nov. 6, 1951 |